United States Patent
Rune et al.

(10) Patent No.: US 10,999,815 B2
(45) Date of Patent: May 4, 2021

(54) METHOD, FIRST NETWORK NODE, COMPUTER PROGRAM AND CARRIER FOR HANDLING PAGING OF WIRELESS DEVICES

(71) Applicant: Telefonaktiebolaget LM Ericsson (publ), Stockholm (SE)

(72) Inventors: Johan Rune, Lidingö (SE); Icaro L. J. da Silva, Solna (SE); Gunnar Mildh, Sollentuna (SE); Jose Luis Pradas, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/318,271

(22) PCT Filed: Jul. 19, 2016

(86) PCT No.: PCT/SE2016/050725
§ 371 (c)(1),
(2) Date: Jan. 16, 2019

(87) PCT Pub. No.: WO2018/017002
PCT Pub. Date: Jan. 25, 2018

(65) Prior Publication Data
US 2019/0239182 A1 Aug. 1, 2019

(51) Int. Cl.
*H04W 68/00* (2009.01)
*H04W 76/11* (2018.01)
*H04W 36/00* (2009.01)
*H04W 60/00* (2009.01)
*H04W 68/02* (2009.01)
*H04W 68/04* (2009.01)

(52) U.S. Cl.
CPC ..... *H04W 68/005* (2013.01); *H04W 36/0033* (2013.01); *H04W 60/00* (2013.01);
(Continued)

(58) Field of Classification Search
CPC . H04W 68/02; H04W 74/0841; H04W 76/27; H04W 68/025; H04W 68/005; H04Q 7/00; H04Q 7/20
See application file for complete search history.

(56) References Cited

U.S. PATENT DOCUMENTS

| 8,996,043 B1 * | 3/2015 | Oroskar | H04W 68/02 |
| | | | 455/458 |
| 2016/0309442 A1 * | 10/2016 | Lian | H04W 64/00 |
| 2019/0182803 A1 * | 6/2019 | Rune | H04W 68/02 |

FOREIGN PATENT DOCUMENTS

| GB | 2513182 A | 10/2014 |
| JP | 2007151045 A | 6/2007 |

(Continued)

OTHER PUBLICATIONS

Unknown, Author, "Benefits and impacts analysis for paging initiated by RAN", 3GPP TSG-RAN WG3 #92, R3-161086, Nanjing, P.R. China, May 23-27, 2016, pp. 1-5.
(Continued)

*Primary Examiner* — Iqbal Zaidi
(74) *Attorney, Agent, or Firm* — Murphy, Bilak & Homiller, PLLC

(57) ABSTRACT

A method and a first network node (200) of a wireless network, for handling paging of a wireless device. A Radio Access Network Area, RANA, which is supported by the first network node (200), is registered (2:1) in a database (202) by network nodes IN supporting the RANA, including the first network node (200). The network nodes (204) that support the RANA are then identified (2:3) in the database (202). When it is detected (2:2) that a wireless device (D1) needs to be paged in the RANA, e.g. for receiving data, a paging message is distributed (2:4) to the identified set of network nodes (204) as an instruction to perform radio transmission of the paging message. Further, which is avail-
(Continued)

able to the network nodes throughout the wireless network. Thereby, any network node in the wireless network, such as the first network node (200), is able to perform distribution of a paging message to all network nodes that support a particular RANA, as registered in the database (202).

18 Claims, 4 Drawing Sheets

(52) U.S. Cl.
CPC .......... *H04W 68/00* (2013.01); *H04W 68/02* (2013.01); *H04W 76/11* (2018.02); *H04W 68/04* (2013.01)

(56) References Cited

FOREIGN PATENT DOCUMENTS

| | | | |
|---|---|---|---|
| JP | 2009510972 | A | 3/2009 |
| JP | 2015188182 | A | 10/2015 |
| JP | 2016521057 | A | 7/2016 |
| KR | 20120114361 | A | 10/2012 |

OTHER PUBLICATIONS

Unknown, Author, "On RAN initiated paging", 3GPP TSG-RAN WG2 Meeting #94, R2-163932, Nanjing, China, May 23-27, 2016, pp. 1-5.

Unknown, Author, "Paging for light connection", 3GPP TSG-RAN WG2 Meeting #94, R2-163888, Nanjing, China, May 23-27, 2016, pp. 1-6.

Unknown, Author, "Report of 3GPP TSG RAN WG3 meeting #92", TSG-RAN Working Group 3 meeting #93, TSGR3#93 R3-161546, Gothenburg, Sweden, Aug. 22-26, 2016, pp. 1-123.

Unknown, Author, "Discussion on the Paging Area for Light Connection", 3GPP TSG RAN WG2 Meeting #94, R2-163860, China Telecom, Nanjing, China, May 23-27, 2016, 2 pages.

Unknown, Author, "General Principle for Signalling Reduction of Paging Lightly Connected UE", 3GPP TSG RAN WG2 Meeting #94, R2-163884, Potevio, Nanjing, China, May 11-15, 2016, 4 pages.

\* cited by examiner

Registered in database:

| RANA 1 | RANA 2 | RANA 3 | ... |
|---|---|---|---|
| Node 11 | Node 21 | Node 31 | |
| Node 12 | Node 22 | Node 32 | |
| Node 13 | Node 23 | Node 33 | |
| ... | ... | ... | |

METHOD, FIRST NETWORK NODE, COMPUTER PROGRAM AND CARRIER FOR HANDLING PAGING OF WIRELESS DEVICES

TECHNICAL FIELD

The present disclosure relates generally to a method and a first network node of a wireless network, for handling paging of wireless devices.

BACKGROUND

The term "wireless network" is used in this description to denote any network comprising network nodes such as base stations, access points, eNodeBs or the like which are capable of radio communication with wireless devices. The term "Radio Access Network, RAN" may be used interchangeably throughout this disclosure instead of wireless network. The nodes in the network that performs such radio communication with wireless devices are also generally denoted "network nodes" herein. The term "radio access node" may be used interchangeably throughout this disclosure instead of network node. The wireless network or RAN may further be connected to a Core Network, CN.

Further, the term "wireless device" denotes any communication equipment that is capable of radio communication with a wireless network, i.e. with network nodes comprised in a Radio Access Network, RAN, part of the wireless network. Some non-limiting examples of wireless devices that may be involved in the procedures described herein include mobile phones, smartphones, tablets, laptop computers and Machine-to-Machine, M2M, devices.

One of the main states for a wireless device in a Long Term Evolution, LTE, wireless network is the so-called idle mode, where the wireless device is unknown in the RAN, although it has a context (i.e. information/data related to the wireless device) in a Core Network, CN, part of the wireless network to enable the wireless device to be contacted, e.g. for receiving data. In this idle mode or state, a list of Tracking Areas has been allocated to the wireless device by the CN. The wireless device is commonly configured to inform the CN when it enters a Tracking Area that is not in the list by sending an updating-message referred to as a Tracking Area Update Request to the network. This way the CN is able to keep track of where the wireless device is located with the accuracy of the Tracking Area List. When the CN needs to contact the wireless device, e.g. when there is some data to be delivered to the wireless device, the CN initiates paging of the wireless device in the Tracking Areas that are included in the wireless device's assigned list of Tracking Areas.

When the wireless device needs to contacted and paged, the CN is responsible for distributing a paging message to the network nodes that support the Tracking Areas that are included in the wireless device's assigned Tracking Area list. These network nodes will then transmit the paging message at predictable, partly device specific, paging occasions so that the wireless device is able to receive the message from at least one of the transmitting network nodes depending on where the device is located. To enable this procedure, each network node needs to inform the MME(s) about which Tracking Area(s) it supports, e.g. when an S1-MME interface is established. Hence, when a certain wireless device is to be paged the MME can find out which network nodes a paging message should be distributed to, that is according to the Tracking Area list.

This procedure is illustrated in FIG. 1 where a wireless device D1 sends tracking area updating messages to an MME or anchor node 100, e.g. at regular intervals or whenever the device D1 moves into a new Tracking Area, TA, as illustrated by an action 1:1. In another action 1:2, the MME or anchor node 100 receives data directed to the wireless device D1 and finds the TA, in another action 1:3, in which the wireless device D1 is presumably present according to its latest tracking area updating message, in this example TA 1. The MME or anchor node 100 then distributes a paging message to the network nodes 102 that belong to TA 1, in a following action 1:4, which effectively instructs or enables the network nodes 102 in TA 1 to perform radio transmission of the paging message. A final action 1:5 illustrates that the paging message is accordingly transmitted from the network nodes 102 in TA 1.

It is likely that future wireless networks, e.g. networks configured according to the fifth Generation, 5G, will employ a RAN state similar to the above described non-connected idle mode in view of the wireless device, but in which the wireless device is connected in view of the CN, hence the CN does not view the wireless device as idle. In this mode or state, the RAN handles the paging and receives area updates from the wireless device. Such a state is also likely to be introduced in LTE as well, in order to facilitate tight integration of LTE and 5G networks. This state may also be referred to as "dormant state" and in this description an area assigned to the wireless device e.g. for paging purposes is referred to as a "RAN Area, RANA". The dormant state may be used instead of the idle mode in 5G or it may exist in parallel with the idle mode, such that the dormant state and the idle mode may complement each other.

In the dormant state there will be an anchor node, which could be one of the network nodes in the RAN, that maintains the wireless device's associated connection(s) with the CN, such as any control and user plane S1 connections. This anchor node will also be responsible for initiating and distributing paging messages among the network nodes which the wireless devices may listen to in their current RANA when in the dormant state.

Since the RAN handles the paging procedures in such networks, it needs to keep track of which network nodes belong to the same RANA. This is needed for enabling paging in relevant areas and may also be useful for retrieval of device context during page response and network access initiated by the wireless device when in the dormant state. The term "context" here refers to information/data related to the wireless device, wherein this information/data may be static and/or dynamic, where information related to the capabilities or subscription associated with the wireless device could be examples of the former and established bearers, recent mobility statistics and last known location could be examples of the latter. Throughout this description, a network node supporting a RANA means that the network node belongs to the RANA. Each network node should thus preferably be aware of all the other network nodes that belong to the same RANA and optionally also have a connection (e.g. an X2 interface or a corresponding interface) to all the other network nodes in the same RANA to facilitate page distribution.

However, this may be difficult or impossible as compared to the idle state paging in LTE, where the node initiating the paging, i.e. the MME, already has knowledge and the necessary interfaces to all the network nodes that should be involved in the paging. Moreover, the set of network nodes belonging to a RANA may change over time, such as when network nodes are added, removed, relocated or reconfigured. It is thus a problem that a paging message may not be transmitted from one or more network nodes in a paged RANA because of inadequate knowledge about which network nodes currently belong to the RANA.

SUMMARY

It is an object of embodiments described herein to address at least some of the problems and issues outlined above. It is possible to achieve this object and others by using a method and a first network node as defined in the attached independent claims.

According to one aspect, a method is performed by a first network node of a wireless network, for handling paging of a wireless device. In his method, the first network node registers in a database, a Radio Access Network Area, RANA, which is supported by the first network node. The first network node further identifies in the database a set of network nodes that support the RANA. When detecting that a wireless device needs to be paged in the RANA, the first network node distributes a paging message to the identified set of network nodes as an instruction to perform radio transmission of the paging message.

According to another aspect, a first network node of a wireless network is arranged to handle paging of a wireless device. The first network node is configured, e.g. by means of a registering unit, to register in a database, a Radio Access Network Area, RANA, which is supported by the first network node. The first network node is also configured, e.g. by means of an identifying unit, to identify in the database a set of network nodes that support the RANA. The first network node is further configured, e.g. by means of a detecting unit and a distributing unit, respectively, to detect that a wireless device needs to be paged in the RANA, and to distribute a paging message to the identified set of network nodes as an instruction to perform radio transmission of the paging message.

It is an advantage of the above method and first network node that the paging message can be distributed by the network node itself in an efficient manner without using any central paging distribution node. Another advantage is that when essentially all network nodes of the RANA have registered their RANA support in the database in this way, any network node in the RANA can look up the database and identify the network nodes of the RANA with great accuracy and reliability and distribute the paging message to the identified network nodes across the entire RANA.

The above method and first network node may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Figure 1:
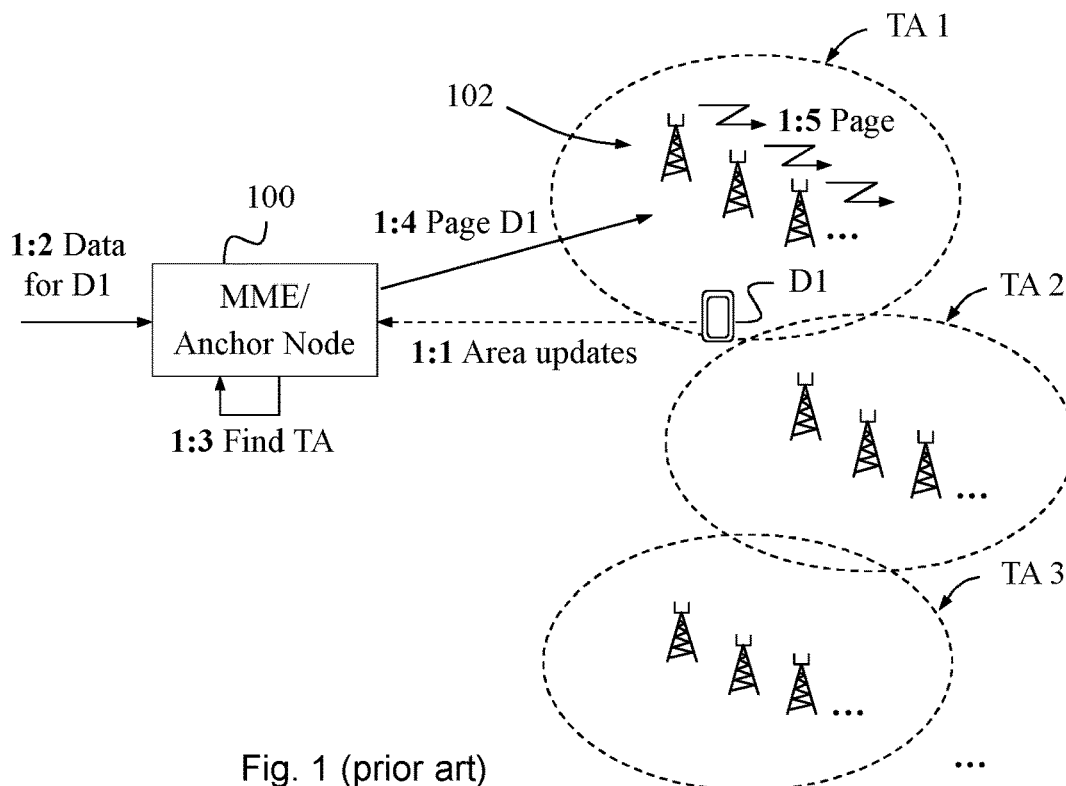
FIG. 1 is a communication scenario illustrating a conventional procedure for paging a wireless device, according to the prior art.

Briefly described, a solution is provided to enable efficient and correct distribution of a paging message to be transmitted over radio from network nodes of at least one RANA in a wireless network. In particular, the solution may be used to ensure that the paging message can be distributed to all network nodes that currently belong to and support a particular RANA, even when there is no central node corresponding to the above-described MME which has RANA information that is up-to-date and distributes paging messages. This can be accomplished by registering information in a database about which network nodes support the RANA, and any network node in the wireless network can then retrieve RANA information from the database to identify which network nodes a paging message should be distributed to whenever paging is performed across a RANA.

This registration is done by the network nodes themselves, e.g. when the respective network node is added, i.e. deployed in the RAN which may happen when the network node is established and connected to the wireless network. A registration may also be made when a previously made registration needs to be updated for the network node, such as when the network node switches from one RANA to a new one (e.g. because the operation and maintenance system determined that it would be beneficial to move a RANA border). A RANA may thus be reconfigured from time to time by adding or removing network nodes. The network node may also confirm to the database that a previously made RANA registration remains valid, e.g. at regular intervals.

It is an advantage of this solution that distribution of a paging message can be made locally by the network nodes themselves in an efficient manner, without using any central paging distribution node such as the MME which may not be implemented in some types of networks such as 5G and evolved LTE networks. Another advantage is that the solution ensures that all network nodes that support a particular RANA can be identified with great accuracy and reliability by means of the registered information in the database which can be kept up-to-date. Thereby, any network node in the RANA is able to distribute the paging message to all other network nodes that support the RANA, based on the information registered in the database.

In the RANA registration, each network node identifies itself and the supported RANA, e.g. by entering a network node identity and a RANA identity in the database. The network node may also register a currently used network address of the network node such as an IP address or a Fully Qualifier Domain Name, FQDN, that can be resolved into an IP address via the Domain Name System, DNS. The database may be implemented as a specific storage entity that is dedicated for the purpose of holding RANA information. The database could also be realized as a dynamic DNS node which is capable of resolving identities into IP addresses.

An example of how the solution may be employed for handling paging of a wireless device, will now be described with reference to a communication scenario illustrated in FIG. 2. In this scenario, a wireless network comprises multiple RANAs denoted RANA 1, RANA 2, RANA 3, . . . where RANA N is one of the RANAs in the network. Each RANA is supported by a set of network nodes in the sense that when a paging message is to be transmitted across a particular RANA in order to reach a paged wireless device, each network node that supports that RANA needs to transmit the paging message so that the wireless device has a chance to receive the paging message regardless of where it is located within the RANA. If the wireless device is not in the RANA, the paging message may need to be distributed across a larger area including one or more other RANAs, which is however not illustrated in this figure.

Figure 2:
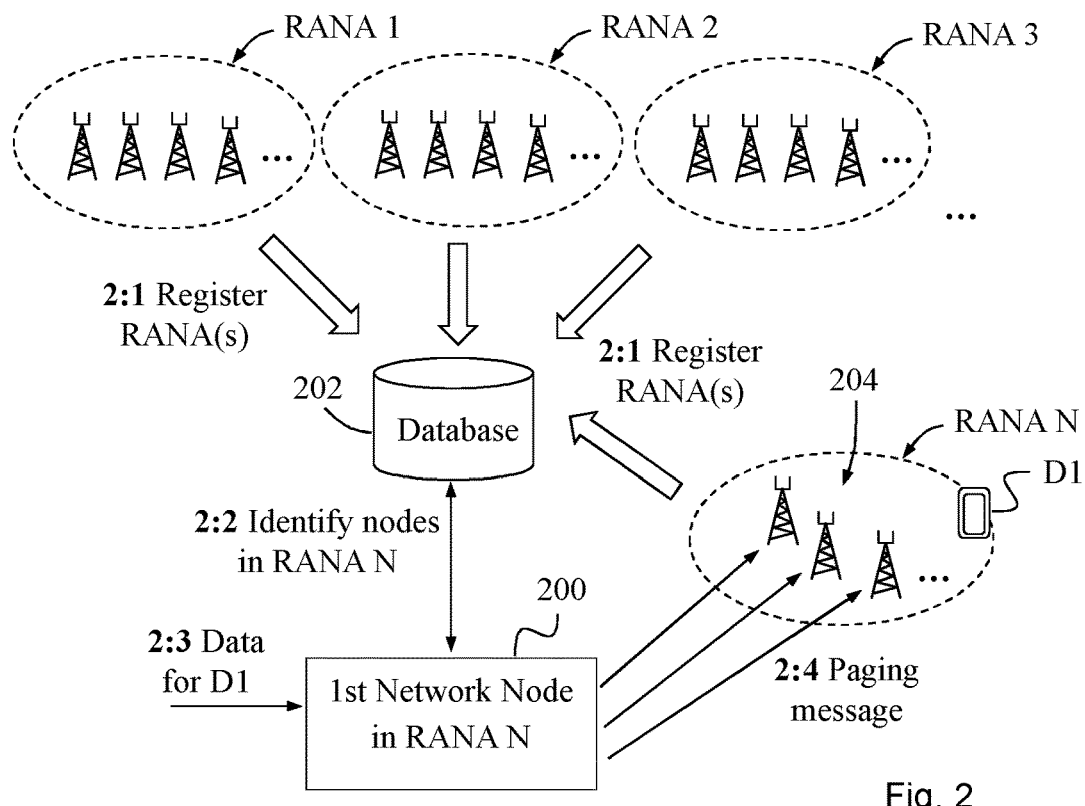
FIG. 2 is a communication scenario illustrating an example of how the solution may be employed for handling paging of a wireless device, according to some possible embodiments.

In FIG. 2, it is illustrated that various network nodes in the RANAs, including a first network node 200 that supports RANA N, registers information in a database 202 regarding which RANAs they currently support, as schematically indicated by an action 2:1. This activity naturally involves several individual registrations made by the network nodes at different independent occasions, e.g. when being deployed in the RANA or reconfigured such that its RANA support is affected, or when just prolonging a previous registration. For example, a network node may support more than one RANA at the same time, which means that two adjacent RANAs are supported by different parts of the network node's coverage area, e.g. different cells or different sectors, or the two RANAs may have partly overlapping coverage in an area served by such a network node. Action 2:1 may thus be performed at any time "in the background", e.g. on a regular or continuous basis or whenever a change has occurred.

A next action 2:2 illustrates that the first network node 200 of RANA N queries the database 202 to identify the network nodes supporting, i.e. belonging to, its own RANA N. This query may comprise an identifier of RANA N, e.g. in the form of an FQDN or a type of identifier used only for RANAs, which can be used as a lookup key in the database which then returns a list of network nodes that support the queried RANA N. In this list, the network nodes may be identified by their IP addresses or by respective FQDNs which can be translated into IP addresses. In general, an IP address can be seen as contact information useful for establishing connections with the network nodes.

If the network nodes have performed their RANA registrations properly as of action 2:1, this list should be accurate by including all network nodes that support RANA N. The first network node 200 may repeat this action, e.g. at regular intervals, to make sure it has RANA information that is always up-to-date. Once the list of network nodes is obtained, the first network node 200 may also establish a connection with each network node in the list using their respective IP addresses. Thereby, the first network node 200 is prepared to distribute any paging messages across its own RANA N.

Another action 2:3 illustrates that the first network node 200 receives data e.g. from a core network, not shown, which data is addressed to a wireless device D1 which has been detected as being likely located somewhere in RANA N. The expected whereabouts of wireless devices in the wireless network may be generally maintained based on tracking area updating messages from the wireless device in the manner described above, e.g. by suitable functionality in the core network. In this solution it is simply assumed that such location information is available with the accuracy level of a RANA, and the currently presumed RANA of D1, in this case RANA N, may be indicated to the first network node 200 in a suitable manner.

Having received the data to be transmitted to the wireless device D1, the first network node 200 is responsible for finding a network node from which the device D1 can properly receive radio signals and detect a paging message directed to D1, for establishing a session where the data can be transmitted to D1. At this point, the network node 200 therefore needs to know virtually all network nodes that currently support the RANA N and distribute the paging message to these network nodes for radio transmission over their respective coverage areas. This is possible as action 2:2 has been performed, and the list of network nodes obtained in that action can now be utilized for finding the network nodes to which the paging massage should be distributed. Alternatively, or additionally, action 2:2 may be performed upon receiving the data, that is after action 2:3.

A final action 2:4 illustrates that the first network node 200 distributes the paging message to the network nodes in the list, so that they can page D1 by transmitting the paging message over radio to see if any of the network nodes receives any response from the device D1. If a network node in RANA N receives a page response from D1, that network node will fetch the data from the first network node 200 and transmit the data to device D1 in a communication session. The paging procedure as such may be conducted in a conventional manner which is outside the scope of this disclosure.

An example of how the solution may be employed in terms of actions performed by a first network node, such as the network node 200 of FIG. 2, for handling paging of a wireless device, will now be described with reference to the flow chart in FIG. 3. Reference will also be made, without limiting or losing applicability of the features described, to elements in the example shown in FIG. 2. In this procedure it is assumed that the first network node 202 is capable of distributing a paging message to other network nodes whenever a wireless device is to be paged. Although this example refers to paging in one RANA, it can be understood that the example is also applicable for paging in two or more RANAs in the manner described below.

Figures 3, 4:
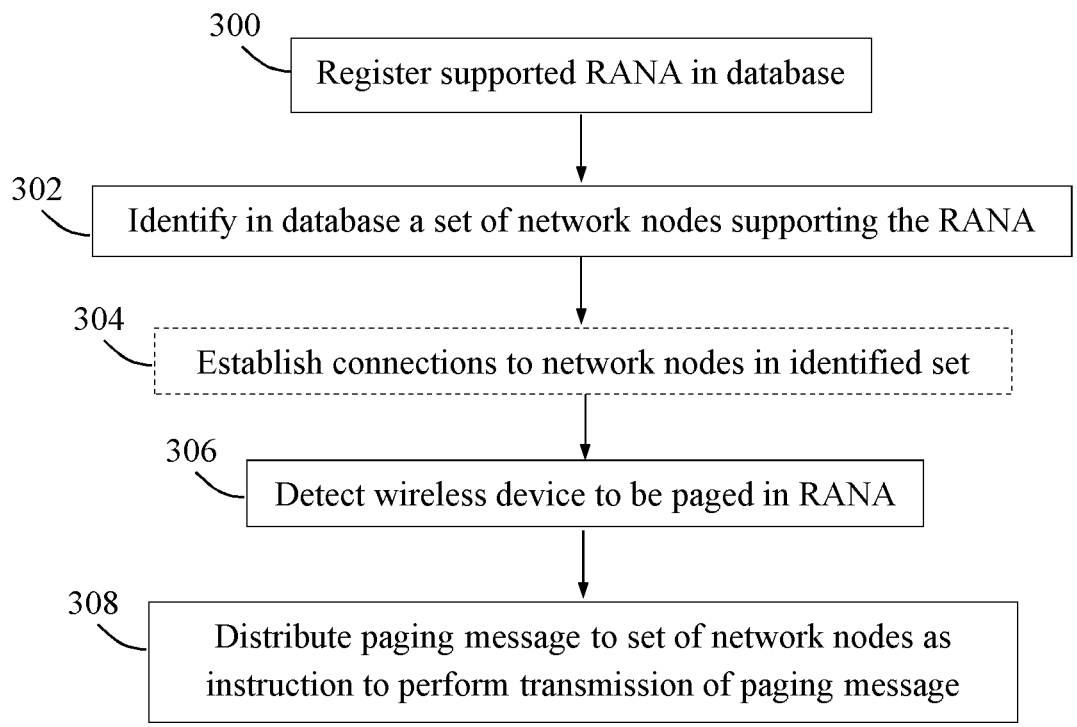
FIG. 3 is a flow chart illustrating a procedure in a first network node, according to further possible embodiments.
FIG. 4 is a an example information table in a database comprising registered RANAs as supported by different network nodes, in accordance with embodiments herein.

The procedure illustrated by FIG. 3 can thus be used to accomplish the functionality and benefits described above. In this description, the term "Radio Access Network Area, RANA" should be understood as an area comprised of cells or similar coverage areas which are served by network nodes supporting the RANA so that a wireless device can be paged in the RANA by radio transmission of a paging message from the network nodes of the RANA. "Tracking area" and "Paging area" are examples of alternative terms that could also be used herein.

The actions of FIG. 3 will first be briefly outlined and then some example embodiments that could optionally be employed will also be described and explained. A first action 300 illustrates that the first network node 200 registers in a database 202, a RANA which is supported by the first network node 200. This action corresponds to action 2:1 in FIG. 2. It could also be said that the network node 200 "belongs" to this RANA by supporting it. In this action 300, "a RANA" is not limited to only a single RANA but it should be seen as at least one RANA thus not excluding registration of two or more supported RANAs when applicable. In this registration operation, the first network node 200 may obtain from the database 202 information about other network nodes also supporting the same RANA.

In a next action 302, the first network node 200 identifies in the database 202 a set of network nodes 204 that support the RANA to which the first network node 200 belongs, i.e. its own RANA. This information can be regarded as reliable and valid provided that all network nodes 204 have registered their RANA support.

FIG. 4 is a table illustrating an example of information that has been registered in a database in the above-described manner. It is thus shown that a first set of network nodes 11, 12, 13, . . . support RANA 1, a second set of network nodes 21, 22, 23, . . . support RANA 2, a third set of network nodes 31, 32, 33, . . . support RANA 3, and so forth. The information registered for each network node, schematically illustrated as "Node xx", includes a network node identifier and some suitable contact information that can be used for establishing a connection to the respective node.

A next optional action 304 illustrates that the first network node 200 may at this point establish connections to the network nodes in identified set of network nodes 204 supporting the RANA, e.g. by using contact information of the network nodes registered in the database. In a further action 306, the first network node 200 detects that a wireless device D1 needs to be paged in the above-mentioned RANA. This could be made when receiving data to be transmitted to the device D1 as of action 2:3 in FIG. 2. As indicated above, connections may optionally be established to the network nodes after detecting that device D1 needs to be paged so that action 304 would be performed after action 306. In this action, it is also possible to detect that the device D1 needs to be paged in one or more other RANAs as well. For example, the device D1 may first be paged in one RANA and if it is not found in that RANA, the paging may be expanded across one or more other RANAs.

A final action 308 illustrates that the first network node 200 distributes a paging message to the identified set of network nodes 204 as an instruction to perform radio transmission of the paging message. If not done earlier, as of action 304, the first network node 200 will in action 308 make sure that a connection is established to each network node in the set of network nodes 204 to enable distribution of the paging message. The paging message may also be sent to a network node via an intermediate network node so that the paging message can be distributed in multiple "hops". An example of such distribution will be described later below with reference to FIG. 6.

Some non-limiting example embodiments that can be used in the above procedure, will now be described. In one example embodiment, the first network node 200 may establish connections to at least some of the network nodes in the identified set of network nodes 204, and can then distribute the paging message using said connections, e.g. as described above for action 304. The first network node 200 may further establish connections to one or more network nodes supporting other RANAs as well.

In another example embodiment, the first network node 200 may perform said registering and identifying via a core network node serving the RANA. If so, another example embodiment may be that the action of distributing may comprise sending the paging message to a core network node as a relay for distribution of the paging message to the identified set of network nodes. These embodiments may be useful when the current RANA does not have connections towards other RANAs.

In another example embodiment, the paging message sent to the core network node may be addressed to the RANA or to each network node in the identified set of network nodes 204. In either case, the core network node is able to contact all network nodes of the RANA and relay the paging message thereto. In another example embodiment, the core network node may also be used as a relay for retrieving a context of the wireless device from another network node belonging to the RANA.

The context retrieval may in exemplary embodiments be enabled by a context identifier, which includes an identifier of a network node storing the context and preferably also a part identifying the context within the network node storing the context. The context identifier may be provided from the wireless device when it contacts the network, e.g. when responding to a page or when switching from a dormant to an active state. In the case of paging, an alternative could also be that the context identifier is included in the paging message which in turn is distributed from the anchor node to network nodes taking part in the paging of the wireless device.

Figure 5:
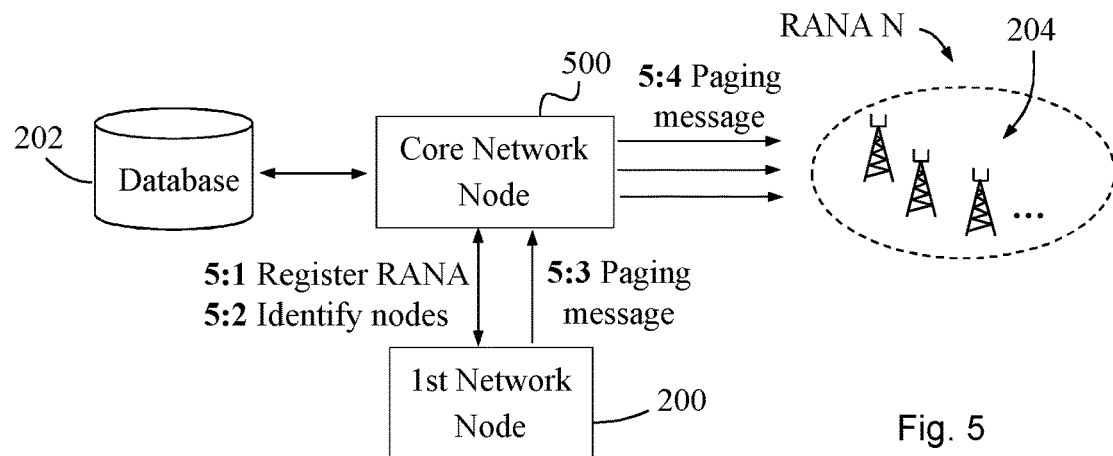
FIG. 5 is a communication scenario illustrating another example of how the solution may be employed, according to further possible embodiments.

An example of how a core network node may be employed in the above-described embodiments is shown in FIG. 5 where the first network node 200 is connected to the core network node 500 which is configured to convey RANA registrations from network nodes of a RANA N in the database 202, and to assist distribution of paging messages to the network nodes of RANA N. A first action 5:1 illustrates that the first network node 200 performs a RANA registration of RANA N which is supported by network node 200, via the core network node 500. Although not shown here, it is assumed that the other network nodes of RANA N also perform RANA registrations so that the database 202 is populated with RANA information in the manner described above, e.g. as shown in FIG. 4.

In another action 5:2, the first network node 200 identifies in the database 202 a set of network nodes 204 that support the RANA N, which is done by sending a database query or the like to the database 202 via the core network node 500. In another action 5:3, the first network node 200 sends a paging message to core network node 500 for distribution to the network nodes 204 of RANA N. The core network node 500 then relays the paging message to all network nodes 204 of RANA N, in action 5:4.

It was mentioned above that a network node may support and belong to more than one RANA at the same time. In another example embodiment, the first network node 200 may in that case register in the database 202 multiple RANAs which are supported by the first network node 200. The first network node 200 may then detect that the wireless device needs to be paged in at least one of the registered RANAs. In that case the first network node 200 is able to distribute the paging message across the at least one RANA using the information in the database.

In another example embodiment, the registering performed in action 300 may comprise registering in the database 202 an IP address or a Fully Qualified Domain Name, FQDN, of the first network node 200 and an identifier of the RANA supported by the first network node 200. In another example embodiment, said registering of action 300 may be performed when the first network node 200 is deployed in the RANA or when the first network node 200 has been reconfigured so that a previously made registration needs to be updated. In another example embodiment, the identifying performed in action 302 may comprise sending a query to the database 202 with an identifier of the RANA as a lookup key, which was also mentioned above.

In another example embodiment, the paging message may be received from another network node belonging to the RANA and the first network node 200 may in that case act as a hub node, a relaying node or a forwarding node by forwarding the paging message over connections to at least some of the network nodes that belong to the RANA.

In another example embodiment, the first network node 200 may send the paging message in a first hop only to a subset of neighbouring network nodes in the identified set of network nodes, so that the paging message is distributed across the identified set of network nodes by means of at least a second hop of forwarding the paging message from the neighbouring network nodes to their respective neighbouring network nodes belonging to the same RANA.

Figure 6:
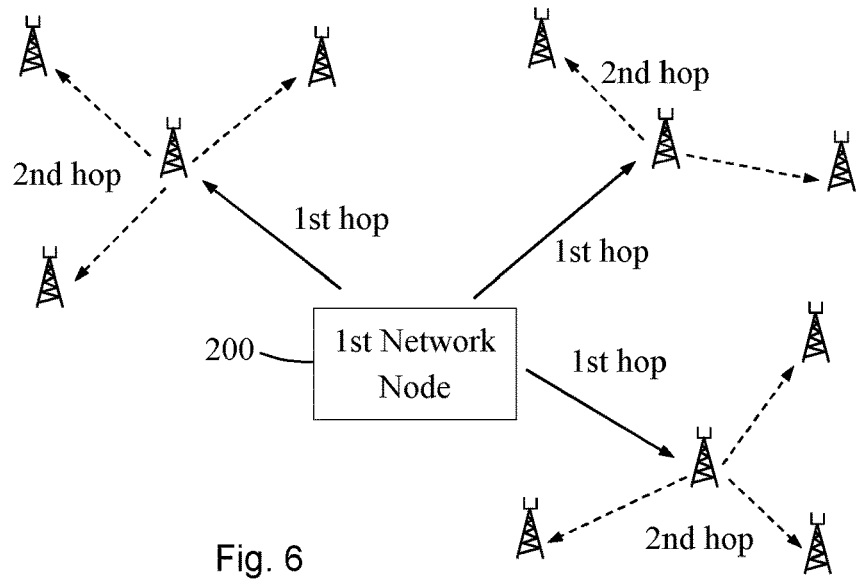
FIG. 6 is a communication scenario illustrating another example of how a paging message is distributed in at least two successive hops, according to further possible embodiments.

An example of how this embodiment may be employed is shown in FIG. 6 where the first network node 200 sends the paging message to three neighbouring network nodes, indicated as a first hop. Having received the paging message, each of those three neighbouring network nodes forwards the paging message to their respective neighbouring network nodes, indicated as a second hop. In this embodiment, the paging message may be sent to any number of neighbouring network nodes and any number of hops may be required before the message has reached all network nodes of the RANA, depending on the size and configuration of the network. The embodiment is thus not limited in this respect.

In another example embodiment, when multiple hops are employed, the paging message may comprise a message identifier which can be used to avoid that the paging message is forwarded to any network node from which the same paging message has been received. For example, the network nodes that received the paging message in the first hop can thereby avoid sending the paging message in the second hop back to the network node that sent the message in the first hop. In another example embodiment, the first network node 200 may also establish connections to the above-mentioned subset of neighbouring network nodes and can then send the paging message using said connections in the first hop.

Figure 7:
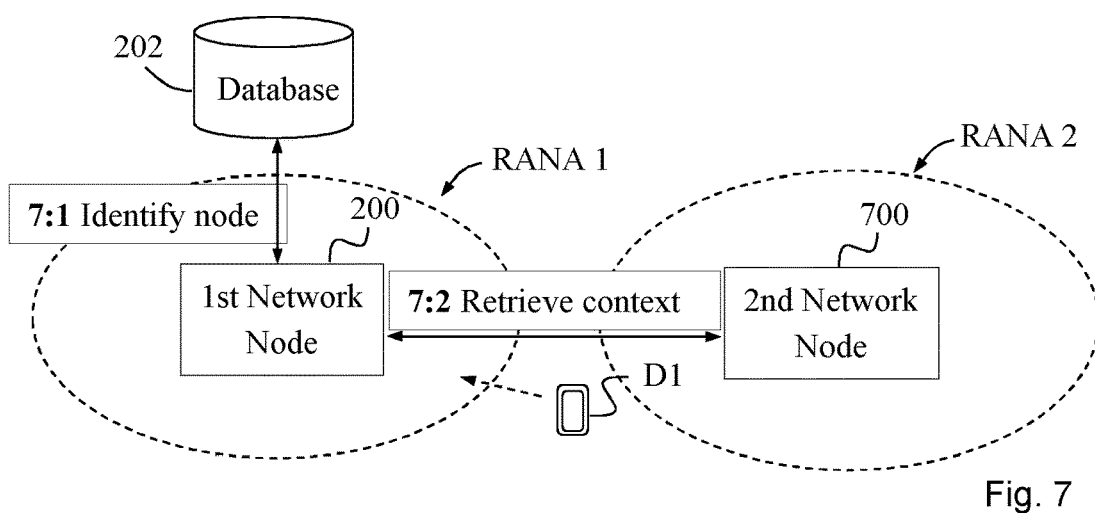
FIG. 7 is a communication scenario illustrating another example of how a device context can be retrieved from a network node of another RANA, according to further possible embodiments.

In another example embodiment, the first network node 200 may identify in the database 202 a second network node belonging to another RANA, and retrieve from the second network node a context of the wireless device when the wireless device is handed over from the second network node to the first network node 200. FIG. 7 illustrates an example of how the first network node 200 may retrieve a device context by using RANA information that has been registered in the database 202.

In this example it is assumed that a handover procedure has been initiated for handing over a wireless device D1 from the second network node 700 to the first network node 200. In a first action 7:1, the first network node 200 belonging to RANA 1 identifies the second network node 700 which belongs to and supports RANA 2. The first network node 200 in this action also establishes a connection with the network node 700 using contact information that the network node 700 has registered in the database 202 along with its RANA information. A next action 7:2 illustrates that the first network node 200 retrieves a context of device D1 from the identified second network node 700, which context is used by the first network node 200 for communication with the device D1 after the handover has been completed. The retrieval and use of a device context as such can be done in a regular manner which is however outside the scope of this disclosure.

Another example of how a network node of a wireless network, such as the above first network node 200, may operate when the solution is employed, will now be described with reference to the flow chart in FIG. 8 In this example it is assumed that the above RANA registration in the database has been performed by network nodes throughout the wireless network, e.g. as described for actions 2:1 and 300. A first action 800 illustrates that the network node receives a paging request from a core network, thus requesting the network node to distribute a paging message addressed to a wireless device. This action basically corresponds to action 2:3 in FIG. 2.

In a next action 802, the network node determines, i.e. identifies, a RANA in which the paging message should be transmitted by network nodes in the RANA. It is then checked in a next action 804 whether the determined RANA is the network node's own supported RANA or not. If so, the network node identifies in the database a set of network nodes that support its own RANA, in another action 806. If the determined RANA is another RANA not supported by the network node, the network node identifies in the database a set of network nodes that support the other RANA, in another action 808. Regardless of whether action 806 or action 808 was performed, a final action 810 illustrates that the network node distributes the paging message to the set of network nodes identified in either action 806 or action 808 depending on the outcome of action 804.

Figure 9:
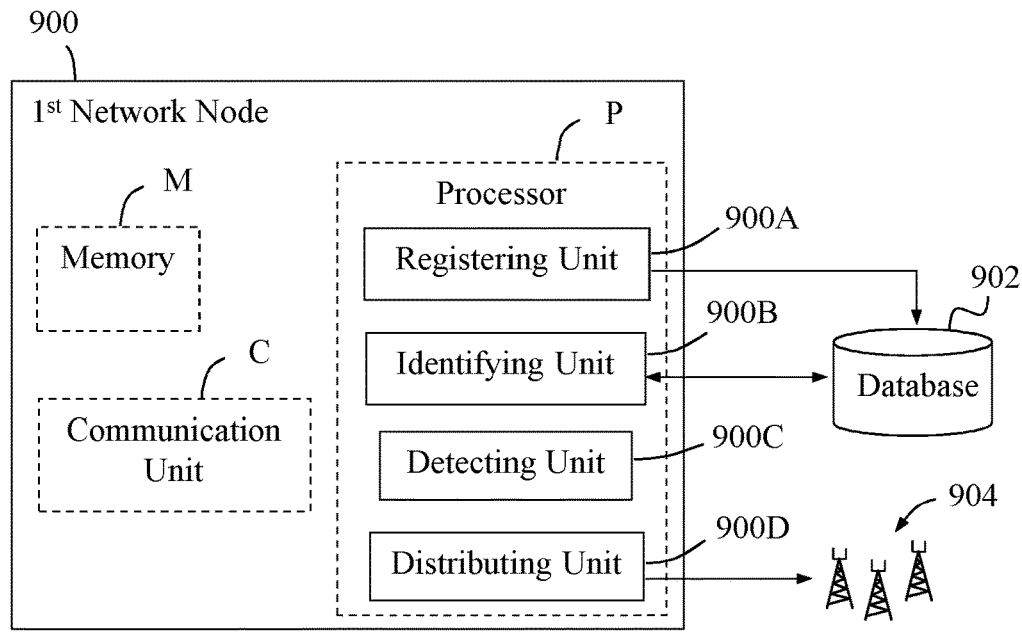
FIG. 9 is a block diagram illustrating a first network node in more detail, according to further possible embodiments.

The block diagram in FIG. 9 illustrates a detailed but non-limiting example of how a first network node 900 of a wireless network may be structured to bring about the above-described solution and embodiments thereof.

The first network node 900 may thus be configured to operate according to any of the above-described examples and embodiments. The first network node 900 is shown to comprise a processor P and a memory M, the memory M comprising instructions executable by said processor P whereby the first network node 900 is operative as described herein. The first network node 900 also comprises a communication unit C representing suitable equipment for receiving and sending information in the manner described herein. The communication unit C is configured for communication with network nodes of the wireless network over suitable interfaces such as the X2 interface, and using a suitable protocol for the described communication depending on the implementation. The solution and embodiments herein are thus not limited to using any specific types of networks, technology or protocols for communication.

Figure 8:
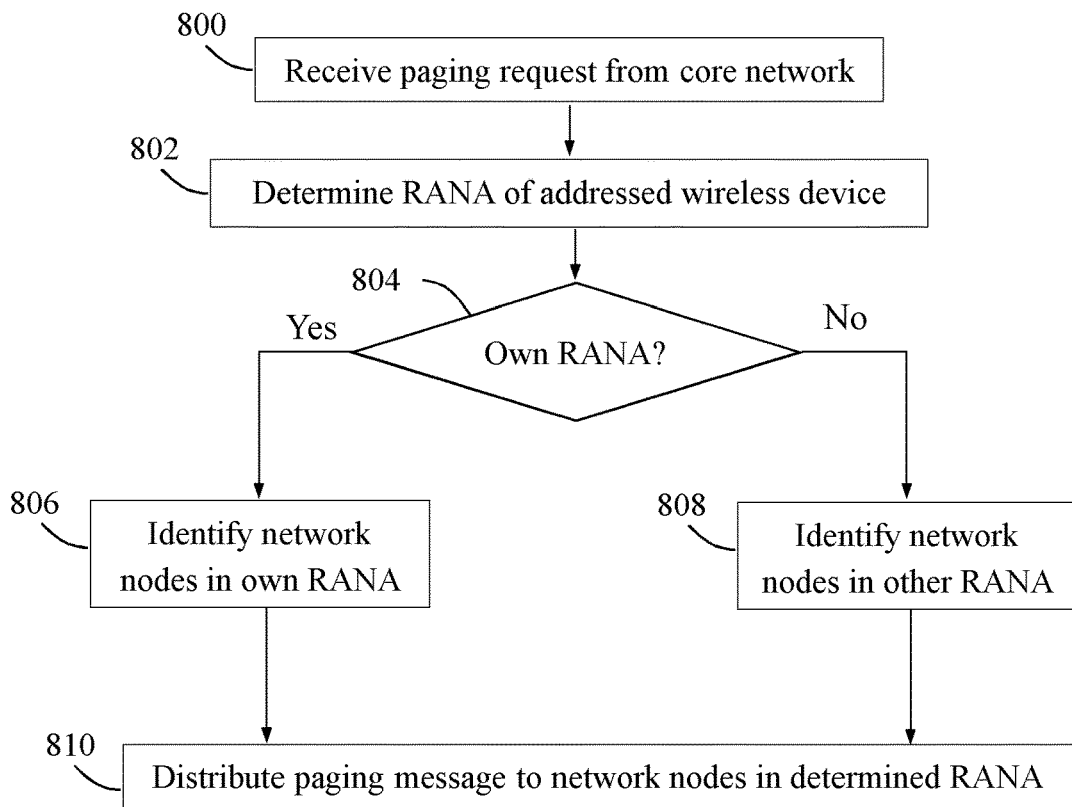
FIG. 8 is a flow chart illustrating another example of a procedure in the first network node, according to further possible embodiments.

The first network node 900 comprises means configured or arranged to perform at least some of the actions of the flow charts in FIGS. 3 and 8. The first network node 900 is arranged to handle paging of a wireless device. The first network node 900 is configured to register in a database 902, a Radio Access Network Area, RANA, which is supported by the first network node 900. This operation may be performed by a registering unit 900A in the first network node 900, e.g. in the manner described for action 300 above.

The first network node 900 is also configured to identify in the database 902 a set of network nodes 904 that support the RANA. This operation may be performed by an identifying unit 900B in the first network node 900, e.g. in the manner described for action 302 above. The first network node 900 is further configured to detect that a wireless device needs to be paged in the RANA. This operation may be performed by a detecting unit 900C in the first network node 900, e.g. in the manner described for action 306 above.

The first network node 900 is further configured to distribute a paging message to the identified set of network nodes 904 as an instruction to perform radio transmission of the paging message. This operation may be performed by a distributing unit 900D in the first network node 900, e.g. in the manner described for action 308 above.

It should be noted that FIG. 9 illustrates various functional units in the first network node 900, and the skilled person is able to implement these functional units in practice using suitable software and hardware. Thus, the solution is generally not limited to the shown structures of the first network node 900, and the functional units 900A-D therein may be configured to operate according to any of the features and embodiments described in this disclosure, where appropriate.

The functional units 900A-D described above could be implemented in the first network node 900 by means of suitable hardware and program modules of a computer program comprising code means which, when run by the processor P causes the first network node 900 to perform at least some of the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the first network node 900 in the form of a memory having a computer readable medium and being connected to the processor P. The computer program product or memory in the first network node 900 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the first network node 900.

The solution described herein may thus be implemented in the first network node 900 by means of a computer program comprising instructions which, when executed on at least one processor, cause the at least one processor to carry out the actions according to any of the above features and embodiments, where appropriate. A suitable carrier containing the above computer program may also be used when implementing the solution, wherein the carrier is one of an electronic signal, optical signal, radio signal, a computer program storage product, or a computer readable storage medium.

Advantages of the above-described solution and its embodiments include that distribution of a paging message can be handled internally within a RANA without using any central paging distribution node such as the MME. Further, all network nodes that support a particular RANA can be identified with great accuracy and reliability by means of the registered information in the database which is available to the network nodes throughout the wireless network. Thereby, any network node in the wireless network is able to perform distribution of a paging message in the manner described above.

Some further examples and features of the above-described solution and its embodiments will now be discussed.

If a network node has been subjected to a configuration change that impacts the registered information in the database, it should update the information in the database. The network node may also inform the other network nodes in the RANA which could potentially be affected by the configuration change. Similarly, if a new network node is deployed, it should register its RANA and contact information in the database, and identify all the other network nodes that have registered the same RANA in the database. The new network node may further establish connections/interfaces to these network nodes of the RANA. Optionally, a network node may periodically check for relevant updates in the database, e.g. as a backup solution for any changes of network node configurations that the network node may have failed to receive.

It was mentioned above that the database may be realized in a DNS node. In this case, the network nodes of a RANA could register their RANA ID as an FQDN, possibly in addition to registering a respective network node ID as an FQDN, and a query on the RANA ID FQDN to the DNS node would return a list of the IP addresses registered with that RANA ID FQDN. Alternatively, the query on the RANA ID FQDN could return a list of the network node ID FQDNs of the network nodes which have registered this RANA ID FQDN and these network node ID FQDNs could in turn be translated into IP addresses.

It was also mentioned above that a device context may be retrieved by using RANA information that has been registered in the database 202. The above-described database mechanism could thus be used to enable a network node of a RANA to fetch a network internal context of a wireless device from another network node outside the RANA, which was described above with reference to FIG. 7. This can be done by means of "on-demand" lookup operations in the database. The actual context fetching could use an existing connection/interface to the other network node if such an interface/connection exists. Otherwise, a temporary connection/interface may be established to the other network node or the core network node may be used as a "relay node" to convey the messages involved.

This context fetching may utilize the network node ID to find the network node holding the context, regardless of whether the context fetching is relayed via a core network node or handled internally in the RAN. To support this context fetching, the network node ID should be registered in the database 202. In case the context fetching is performed internally within the wireless network, the network node ID could be registered in the database as an FQDN, which may be translated into an IP address via DNS, or it could be associated with an IP address in the database.

It was also mentioned above that the solution may be used to support paging distribution across multiple RANAs for wireless devices that are configured with lists of RANAs or RANA IDs, which is similar to wireless devices that are configured with lists of Tracking Area Identifiers in an LTE network. To this end, instead of just querying the database using its own RANA ID, a network node may do the same also for RANA IDs of other reasonably close RANAs, e.g. of neighboring RANAs and possibly also of the neighbors' neighboring RANAs. To be precise, the network node could do this for all other RANAs that the network node may include in a list of RANAs, or RANA IDs, that it allocates to a wireless device.

It was mentioned above that the first network node 200 may receive a paging message from another network node belonging to the same RANA, and act as a hub node by forwarding the paging message over connections to the network nodes that belong to the RANA. Some further details and features of this embodiment will now be described. In this embodiment, instead of employing a full or partial "mesh" of connections between virtually all network nodes, a hierarchical structure may be used where one network node in each RANA is configured to act as a hub for the RANA. This means that the hub node has interfaces/connections to all other network nodes in the RANA and can thereby relay paging messages between any network nodes in the RANA. The other network nodes may also establish direct interfaces/connections to other network nodes, e.g. to neighboring network nodes having radio coverage areas adjacent to its own radio coverage area, such that handovers of devices between the network nodes may commonly occur. The hub node may in some cases forward the paging message to only a subset of the network nodes that belong to the RANA, e.g. when the paging message is distributed in multiple hops as described above for FIG. 6.

Each hub node should register its RANA information in the database, by storing their respective contact information and supported RANA. A network node may then look up and retrieve the contact information of the hub node serving its RANA from the database, e.g. by including the RANA ID in a query to the database, and establish an interface/connection to the hub node. Distribution of a paging message to the network node of a RANA would in this case be performed via the hub node, such as when a network node that initiates paging of a wireless device in the RANA sends the paging message to the hub node. Then the hub node will forward or relay the paging message to all the other network nodes in the RANA.

A paging message may also be sent to a single other network node via the hub node by addressing the paging message to the destination network node using its network node ID.

When a paging message is distributed across multiple RANAs and/or a device context is retrieved across RANA borders, each hub node in the RANAs is able to retrieve the contact information of all other hub nodes in the wireless network from the database, and the hub nodes can establish interfaces/connections between each other, thus forming a full or partial mesh. A special query for the hub nodes may be sent to the database which then returns the information, including the contact information, that has been registered by all other hub nodes in the database. For example, such a database query could be realized by using a "wild card" RANA ID in the query that a network node would use to retrieve information about the hub node of its RANA.

Another possibility is that a hub node could be dedicated for operation as a hub node although it may also operate as a regular network node in parallel.

While the solution has been described with reference to specific exemplifying embodiments, the description is generally only intended to illustrate the inventive concept and should not be taken as limiting the scope of the solution. For example, the terms "network node", "wireless device", "paging message", "Radio Access Network Area, RANA", "core network node" and "hub node" have been used throughout this disclosure, although any other corresponding entities, functions, and/or parameters could also be used having the features and characteristics described here. The solution is defined by the appended claims.

The invention claimed is:

1. A method performed by a first radio access node in a Radio Access Network (RAN) of a wireless network, for handling paging of a wireless device, the method comprising:
   registering, in a database, a RAN Area (RANA) to which the first radio access node belongs;
   identifying in the database other radio access nodes that belong to the RANA, as an identified set of radio access nodes;
   detecting that a wireless device needs to be paged in the RANA; and
   distributing a paging message to the identified set of radio access nodes as an instruction to perform radio transmission of the paging message;
   wherein said distributing comprises sending the paging message to a core network node as a relay for distribution of the paging message to the identified set of radio access nodes; and
   wherein the paging message sent to the core network node is addressed to the RANA or to each radio access node in the identified set of radio access nodes.

2. The method according to claim 1, wherein said registering and identifying are performed via a core network node serving the RANA.

3. The method according to claim 1, wherein the first radio access node registers in the database multiple RANAs which are supported by the first radio access node, and detects that the wireless device needs to be paged in at least one of the registered RANAs.

4. The method according to claim 1, wherein said registering comprises registering in the database an Internet Protocol (IP) address or a Fully Qualified Domain Name (FQDN) of the first radio access node and an identifier of the RANA supported by the first radio access node.

5. The method according to claim 1, wherein the first radio access node registers the RANA in the database upon deployment of the first radio access node or in response to a reconfiguration of the first radio access node that affects a prior registration in the database by the first radio access node.

6. The method according to claim 1, wherein said identifying comprises sending a query to the database with an identifier of the RANA as a lookup key.

7. A method performed by a first radio access node in a Radio Access Network (RAN) of a wireless network, for handling paging of a wireless device, the method comprising:
   registering, in a database, a RAN Area (RANA) to which the first radio access node belongs;
   identifying in the database other radio access nodes that belong to the RANA, as an identified set of radio access nodes;
   detecting that a wireless device needs to be paged in the RANA; and
   distributing a paging message to the identified set of radio access nodes as an instruction to perform radio transmission of the paging message;
   wherein said registering and identifying are performed via a core network node serving the RANA; and
   wherein the core network node is used as a relay for retrieving a context of the wireless device from another radio access node belonging to the RANA.

8. A method performed by a first radio access node in a Radio Access Network (RAN) of a wireless network, for handling paging of a wireless device, the method comprising:

registering, in a database, a RAN Area (RANA) to which the first radio access node belongs;

identifying in the database other radio access nodes that belong to the RANA, as an identified set of radio access nodes;

detecting that a wireless device needs to be paged in the RANA; and distributing a paging message to the identified set of radio access nodes as an instruction to perform radio transmission of the paging message;

wherein, to distribute the paging message to the identified set of radio access nodes, the first radio access node sends the paging message in a first hop only to a subset of neighbouring radio access nodes in the identified set of radio access nodes, to initiate distribution of the paging message across the identified set of radio access nodes by means of at least a second hop.

9. A first radio access node configured for operation in a Radio Access Network (RAN) of a wireless network, the first radio access node configured to handle paging of a wireless device, wherein the first radio access node comprises:

a processor and a memory, the memory storing instructions executable by the processor whereby the first radio access node is configured to:

register in a database a RAN Area (RANA) to which the first radio access node belongs;

identify in the database other radio access nodes that belong to the RANA, as an identified set of radio access nodes;

detect that a wireless device needs to be paged in the RANA; and distribute a paging message to the identified set of radio access nodes as an instruction to perform radio transmission of the paging message;

wherein the first radio access node is configured to distribute the paging message by sending the paging message to a core network node as a relay for distribution of the paging message to the identified set of radio access nodes; and wherein the paging message sent to the core network node is addressed to the RANA or to each radio access node in the identified set of radio access nodes.

10. The first radio access node according to claim 9, wherein the first radio access node is configured to register the RANA, and identify the set of radio access nodes, via a core network node serving the RANA.

11. The first radio access node according to claim 10, wherein the first radio access node is configured to use the core network node as a relay for retrieving a context of the wireless device from another radio access node belonging to the RANA.

12. The first radio access node according to claim 9, wherein the first radio access node is configured to register in the database multiple RANAs which are supported by the first radio access node, and to detect that the wireless device needs to be paged in at least one of the registered RANAs.

13. The first radio access node according to claim 9, wherein the first radio access node is configured to register the RANA by registering in the database an Internet Protocol (IP) address or a Fully Qualified Domain Name (FQDN) of the first radio access node and an identifier of the RANA supported by the first radio access node.

14. The first radio access node according to claim 9, wherein the first radio access node is configured to register the RANA in the database upon deployment of the first radio access node or in response to a reconfiguration of the first radio access node that affects a prior registration in the database by the first radio access node.

15. The first radio access node according to claim 9, wherein the first radio access node is configured to identify the set of radio access nodes by sending a query to the database with an identifier of the RANA as a lookup key.

16. The first radio access node according to claim 9, wherein the first radio access node is configured to identify in the database a second radio access node belonging to another RANA, and to retrieve from the second radio access node a context of the wireless device being handed over from the second radio access node to the first radio access node.

17. A first radio access node configured for operation in a Radio Access Network (RAN) of a wireless network, the first radio access node configured to handle paging of a wireless device, wherein the first radio access node comprises:

a processor and a memory, the memory storing instructions executable by the processor whereby the first radio access node is configured to:

register in a database a RAN Area (RANA) to which the first radio access node belongs;

identify in the database other radio access nodes that belong to the RANA, as an identified set of radio access nodes;

detect that a wireless device needs to be paged in the RANA; and distribute a paging message to the identified set of radio access nodes as an instruction to perform radio transmission of the paging message;

wherein, to distribute the paging message to the identified set of radio access nodes, the first radio access node is configured to send the paging message in a first hop only to a subset of neighbouring radio access nodes in the identified set of radio access nodes, to initiate distribution of the paging message across the identified set of radio access nodes by means of at least a second hop.

18. The first radio access node according to claim 17, wherein the paging message comprises a message identifier which can be used to avoid that the paging message is forwarded to any radio access node from which the same paging message has been received.

* * * * *